United States Patent
Reiter et al.

(10) Patent No.: US 9,331,478 B2
(45) Date of Patent: May 3, 2016

(54) METHODS AND CIRCUITS FOR REVERSE BATTERY PROTECTION

(71) Applicants: Thomas J. Reiter, Dearborn, MI (US); Ibrahim S. Kandah, Novi, MI (US)

(72) Inventors: Thomas J. Reiter, Dearborn, MI (US); Ibrahim S. Kandah, Novi, MI (US)

(73) Assignee: FREESCALE SEMICONDUCTOR, INC, Austin, TX (US)

( * ) Notice: Subject to any disclaimer, the term of this patent is extended or adjusted under 35 U.S.C. 154(b) by 235 days.

(21) Appl. No.: 14/222,925

(22) Filed: Mar. 24, 2014

(65) Prior Publication Data
US 2015/0270703 A1 Sep. 24, 2015

(51) Int. Cl.
*H02H 3/00* (2006.01)
*H02H 11/00* (2006.01)

(52) U.S. Cl.
CPC ................................ *H02H 11/002* (2013.01)

(58) Field of Classification Search
CPC ...... H02H 3/18; H02H 11/002; H02H 11/003
USPC .......................................................... 361/84
See application file for complete search history.

(56) References Cited

U.S. PATENT DOCUMENTS

| | | | |
|---|---|---|---|
| 5,517,379 A | 5/1996 | Williams et al. | |
| 5,539,610 A * | 7/1996 | Williams | H02H 11/003 307/10.7 |
| 5,726,505 A * | 3/1998 | Yamada | H02H 3/18 307/116 |
| 5,757,600 A | 5/1998 | Kiraly | |
| 2011/0134576 A1* | 6/2011 | Clemente | H02H 11/002 361/77 |
| 2011/0188164 A1* | 8/2011 | Desrochers | H02H 3/18 361/92 |

\* cited by examiner

*Primary Examiner* — Dharti Patel
(74) *Attorney, Agent, or Firm* — The Mason Group Patent Specialists, LLC; Valerie M. Davis

(57) ABSTRACT

A circuit is configured for providing reverse battery protection. The circuit includes a load driver circuit having at least a first half-bridge circuit with topside and bottomside transistors coupled at a midpoint node by a first current terminal of both the topside and bottomside transistors. A second current terminal of the bottomside transistor is coupled to a voltage common node. The circuit also includes: a reverse battery protection transistor having a first current terminal coupled to a battery supply node and a second current terminal coupled to a second current terminal of the topside transistor; a bootstrap capacitor having a first terminal coupled to a the midpoint node between the topside and bottomside transistors of the first half-bridge circuit; and a diode having an anode coupled to a second terminal of the bootstrap capacitor and a cathode coupled to a control terminal of the reverse battery protection transistor.

20 Claims, 3 Drawing Sheets

METHODS AND CIRCUITS FOR REVERSE BATTERY PROTECTION

FIELD

The present disclosure relates generally to protection circuitry and more particularly to methods and circuits for reverse battery protection.

BACKGROUND

Some loads, which are pulse width modulation (PWM) driven during a forward or normal battery condition across a load driver circuit, require protection from an inadvertent application of reverse battery, also referred to herein as a reverse battery condition, across the load driver circuit. For instance, loads that are PWM driven by a load driver circuit that includes switching field effect transistors (FETs) in an H-bridge configuration require an electrical disconnection from a reverse battery path to prevent the destruction of the switching FETs due to a low impedance path through body diodes of the FETS. However, existing techniques or solutions for reverse battery protection have shortcomings.

For example, a simple blocking diode in series with the load driver circuit between a battery supply terminal or node and a voltage common node for a battery prevents current flow through the load driver circuit during a reverse battery condition; but the blocking diode is impractical for high current loads due to power dissipation and reduced headroom. Additionally, some applications use mechanical relays in series with the load driver circuit with blocking diodes in an energizing coil of the relays; but this solution is expensive and is larger relative to other reverse battery protection techniques.

In accordance with other reverse battery protection solutions, inverted FETs are connected in series with the load driver circuit. For example, N-channel FETs can be connected to the voltage common node for the battery, provided that a high enough voltage is provided to the gate of the FET to keep it in enhancement mode during normal battery conditions or operation. However, ground-return currents flowing through the FET produce small voltage drops that can interfere with circuit operation. In another example implementation, a P-channel FET is connected to the battery supply node. However, the most notable disadvantage of this arrangement is the relatively larger size and higher cost over using an N-channel FET. Therefore, in an alternate arrangement, an N-channel FET is connected to the battery supply node. However, the current art requires a dedicated charge pump connected to the gate of this FET to maintain it in enhancement mode during normal battery conditions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
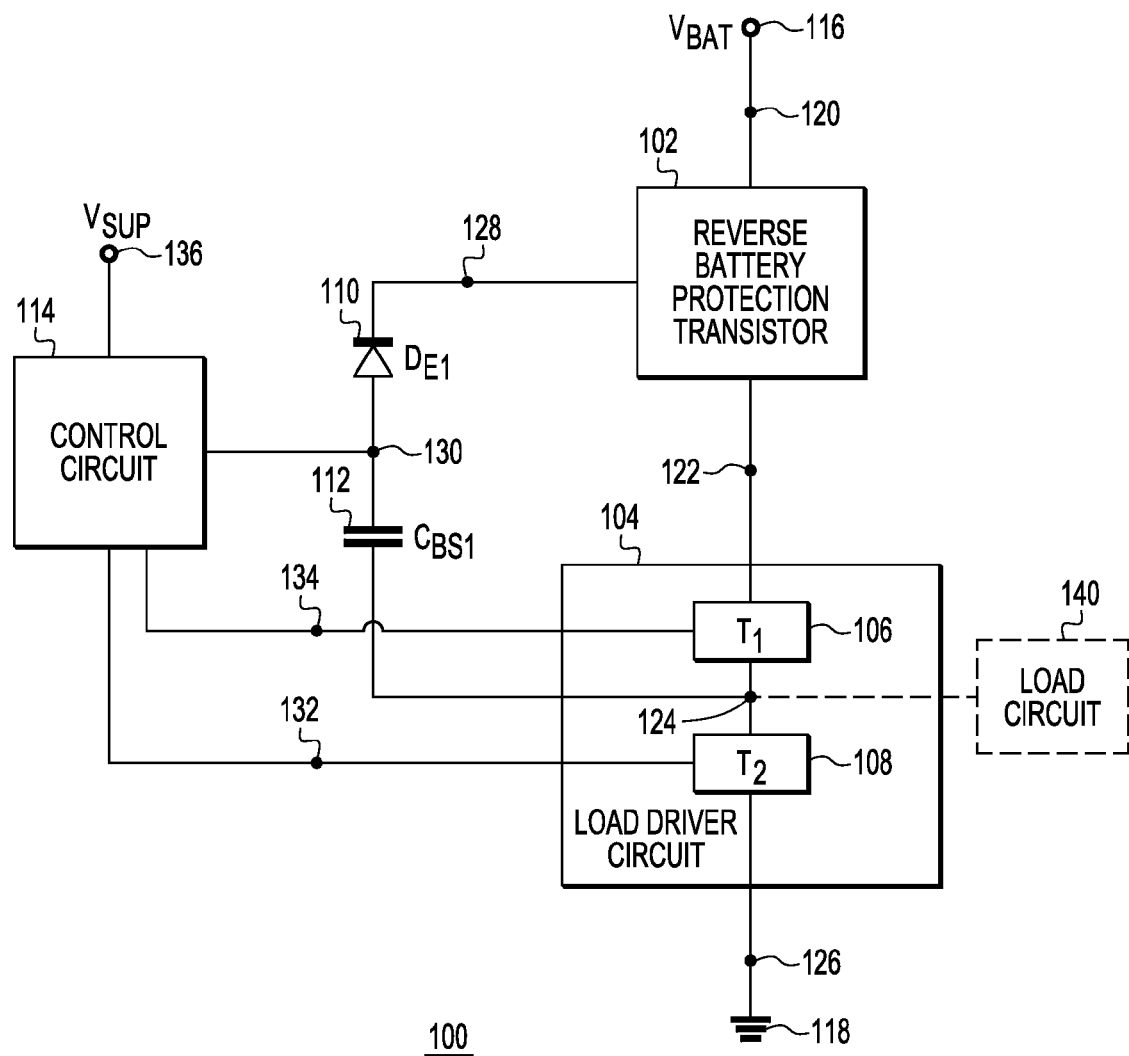
FIG. 1 is a generalized circuit diagram illustrating a circuit configured for providing reverse battery protection, in accordance with an embodiment.

The present disclosure is illustrated by way of example and is not limited by the accompanying figures, in which like reference numbers indicate similar elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Also, the functions included in the flow diagrams do not imply a required order of performing the functionality contained therein.

DETAILED DESCRIPTION

In accordance with the present teachings, a circuit provides reverse battery protection by using a novel solution for enhancing an inverted N-channel reverse battery protection FET that is connected to a battery supply node for a battery and connected in series with a load driver circuit between the battery supply node and a voltage common node for the battery. Embodiments of the present teachings use simple circuitry that does not require a dedicated charge pump connected to the gate of the inverted N-channel reverse battery protection FET for maintaining the FET in enhancement mode during a normal battery condition across the load driver circuit.

In accordance with an embodiment is a circuit configured for providing reverse battery protection. The circuit includes a load driver circuit having at least a first half-bridge circuit, with each half-bridge circuit having a topside transistor and a bottomside transistor coupled at a corresponding midpoint node by a first current terminal of both the topside and bottomside transistors. A second current terminal of each bottomside transistor is coupled to a voltage common node. The circuit also includes: a reverse battery protection transistor having a first current terminal coupled to a battery supply node and a second current terminal coupled to a second current terminal of each topside transistor; and a first bootstrap capacitor having a first terminal coupled to a first midpoint node between first topside and bottomside transistors of the first half-bridge circuit. The circuit further includes a first diode having an anode coupled to a second terminal of the first capacitor and a cathode coupled to a control terminal of the reverse battery protection transistor.

Embodiments of the present teachings use available voltage at the second terminal of at least one bootstrap capacitor to enhance the topside transistor that is coupled to the bootstrap capacitor and to also enhance the reverse battery protection transistor using the diode connected between the second terminal of the bootstrap capacitor and the gate of the reverse battery protection transistor, when the topside transistor is commanded on. When the topside transistor is commanded off, the diode blocks or delays discharge of the voltage on the gate of the reverse battery protection transistor, thereby keeping the reverse battery protection transistor enhanced.

In accordance with another embodiment is a method performed in a circuit configured for providing reverse battery protection. The method includes generating a first voltage level at a second terminal of a first capacitor, wherein a first terminal of the first capacitor is coupled to a load driver circuit at a first midpoint node between first topside and bottomside transistors of the load driver circuit, wherein the first voltage level is generated while the first bottomside transistor is on and the first topside transistor is off. The method also includes boosting the voltage level at the second terminal of the first capacitor to a second voltage level that is higher than the first voltage level while the first bottomside transistor is off and the first topside transistor is on. The method further includes providing the second voltage level to a control terminal of a reverse battery protection transistor that is coupled in series with the load driver circuit between a battery supply node and a voltage common node, wherein the second voltage level is provided through a first diode coupled in series with the first capacitor between the first midpoint node and the control terminal of the reverse battery protection transistor.

In accordance with yet a further embodiment is a circuit configured for providing reverse battery protection. The circuit includes a load driver circuit having at least a first half-bridge circuit, with each half-bridge circuit having a topside transistor and a bottomside transistor coupled at a corresponding midpoint node by a first current terminal of both the topside and bottomside transistors. A second current terminal of each bottomside transistor is coupled to a voltage common node. The circuit also includes: a reverse battery protection transistor coupled in series with the load driver circuit between a battery supply node and the voltage common node; and a set of capacitors having at least a first capacitor. Each capacitor has a first terminal coupled to a midpoint node of a different half-bridge circuit and is configured to generate a transistor enhancement voltage level at a second terminal of the capacitor. The first terminal of the first capacitor is coupled to a first midpoint node between first topside and bottomside transistors of the first half-bridge circuit. The circuit further includes a control circuit coupled to the second terminal of each capacitor. The control circuit is configured, during a forward battery condition between the battery supply node and the voltage common node, to route the transistor enhancement voltage level, at different times, to a control terminal of each topside transistor. The circuit also includes a first diode having an anode coupled to the second terminal of the first capacitor and a cathode coupled to a control terminal of the reverse battery protection transistor. The first diode is configured, at a first time during the forward battery condition, to route the transistor enhancement voltage level from the second terminal of the first capacitor to the control terminal of the reverse battery protection transistor.

FIG. 1 is a generalized circuit diagram illustrating a circuit 100 configured for providing reverse battery protection, in accordance with an embodiment. Circuit 100 includes a load driver circuit 104 that is connected to and provides signals to operate a load circuit 140. In an embodiment, the load circuit 140 is one that requires a PWM signal for proper operation, such as fuel motor pumps, seat motors, or motors for electronic throttle control, to name a few. The load driver circuit 104 is connected to and receives control signals from a control circuit 114. Circuit 100 also includes a reverse battery protection transistor 102 that is coupled to the load driver circuit 104 by a bootstrap capacitor $C_{BS1}$ 112 and an enhancing diode $D_{E1}$ 110.

More particularly, regarding the connectivity of the components of circuit 100, the load driver circuit 104 includes a half-bridge circuit having a topside transistor $T_1$ 106 connected to a bottomside transistor $T_2$ 108 at a midpoint node 124. The transistors $T_1$ 106 and $T_2$ 108 are connected at the midpoint node 124 by respective first current terminals of these transistors. In an embodiment, the transistors 106 and 108 are any suitable transistors that can be operated as switches and, thereby, switched on an off by the control circuit 114 to provide a PWM signal to operate the load circuit 140. In one particular embodiment, one or both of the transistors 106 and 108 are metal-oxide semiconductor field effect transistors (MOSFETs). In another embodiment, one or both of the transistors 106 and 108 are insulated-gate bipolar transistors (IGBTs) transistors. A control terminal for the topside transistor 106 is connected to the control circuit 114 at a node 134, and a control terminal for the bottomside transistor 108 is connected to the control circuit 114 at a node 132. The control circuit 114 provides a control signal, depending on the type of transistor used, to switch the transistors 106 and 108 on and off at different times to provide the PWM signal to the load circuit 140.

The reverse battery protection transistor 102 is connected in series with the load driver circuit 104 between a battery supply node 120 and a voltage common node 126. More particularly, a first current terminal of the reverse battery protection transistor 102 is connected to the battery supply node 120, and a second current terminal of the reverse battery protection transistor 102 is connected to a second current terminal of the topside transistor 106 at a node 122. A second current terminal of the bottomside transistor 108 is connected to the voltage common node 126.

During a normal battery condition, also referred to as a forward battery or forward bias condition, a battery is connected across the reverse voltage protection transistor 102 and the load driver circuit 104, such that a positive voltage $V_{BAT}$ 116 is connected to the battery supply node 120, and the voltage common node 126 is connected to a voltage common or electrical ground 118. In an embodiment, $V_{BAT}$ is about 14 volts (V), and electrical ground 118 is about 0 V. Conversely, during a reverse battery or reverse bias condition across the battery supply node 120 and the voltage common node 126, a battery is incorrectly or inversely connected to the nodes 120 and 126, such that the node 126 is at a more positive voltage than the node 120. In the absence of the reverse battery protection transistor 102, a large enough reverse current could flow through the load driver circuit 104 to damage one or both of the topside 106 and bottomside 108 transistors.

Additionally, a first terminal of the bootstrap capacitor 112 is connected to the midpoint node 124, and a second terminal of the bootstrap capacitor 112 is connected to the control circuit 114 and to an anode of the diode 110 at a node 130. A cathode of the diode 110 is connected to a control terminal of the reverse battery protection transistor 102 at a node 128. A voltage supply terminal 136 is connected to the control circuit 114 to provide a supply voltage $V_{SUP}$ to the control circuit. In an embodiment, $V_{SUP}$ is about 11V but can be a different voltage level, such as 14 V, depending at least in part on the particular application. Moreover, the load circuit 140 is connected to the midpoint node 124 to receive a PWM signal, for instance a current signal, used to operate the load circuit 140 by, for instance, providing a controlled level of power to operate a motor at various speeds.

Figure 2:
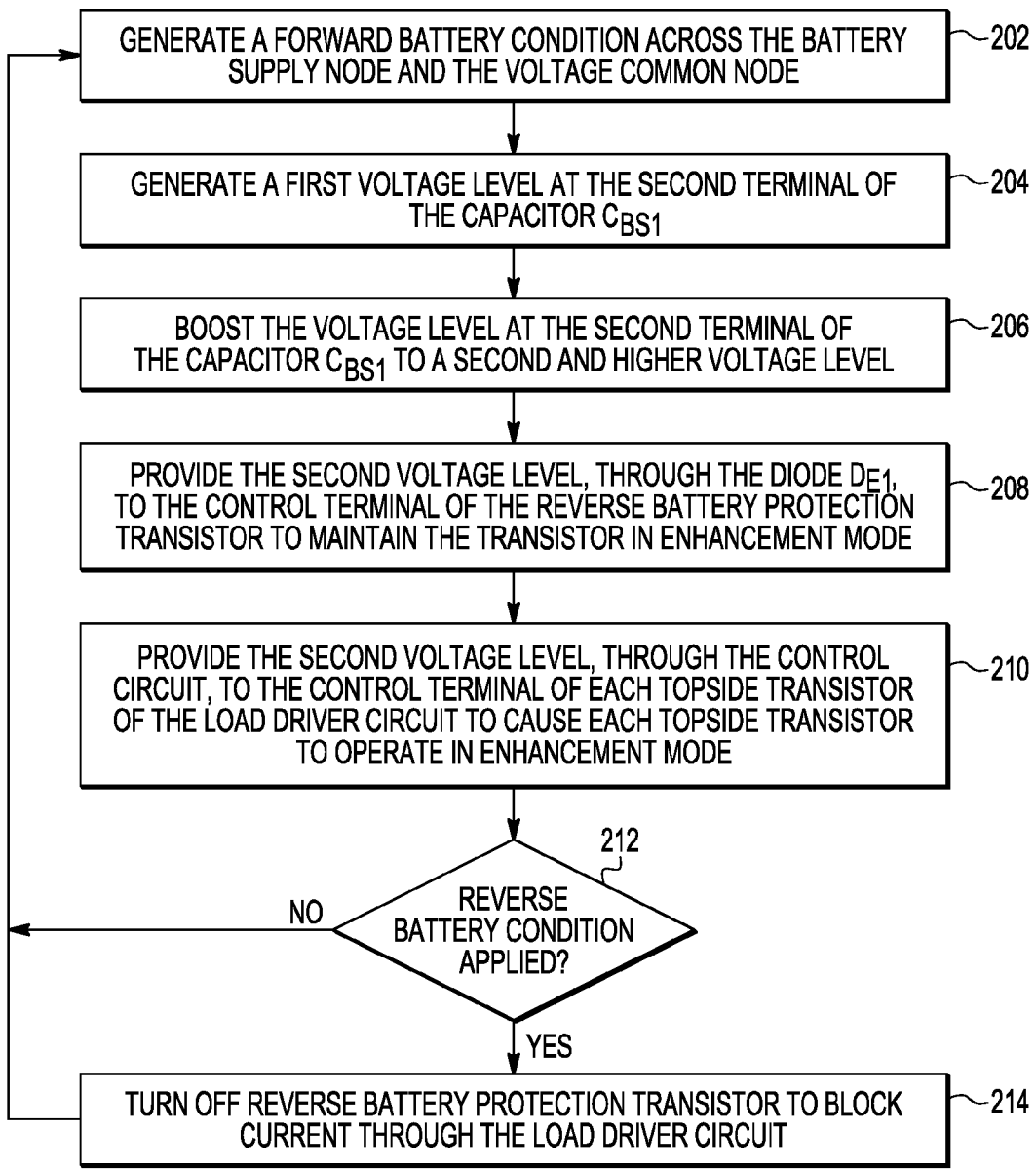
FIG. 2 is a flow diagram illustrating a method performed in a circuit configured for providing reverse battery protection, in accordance with an embodiment.
Figure 3:
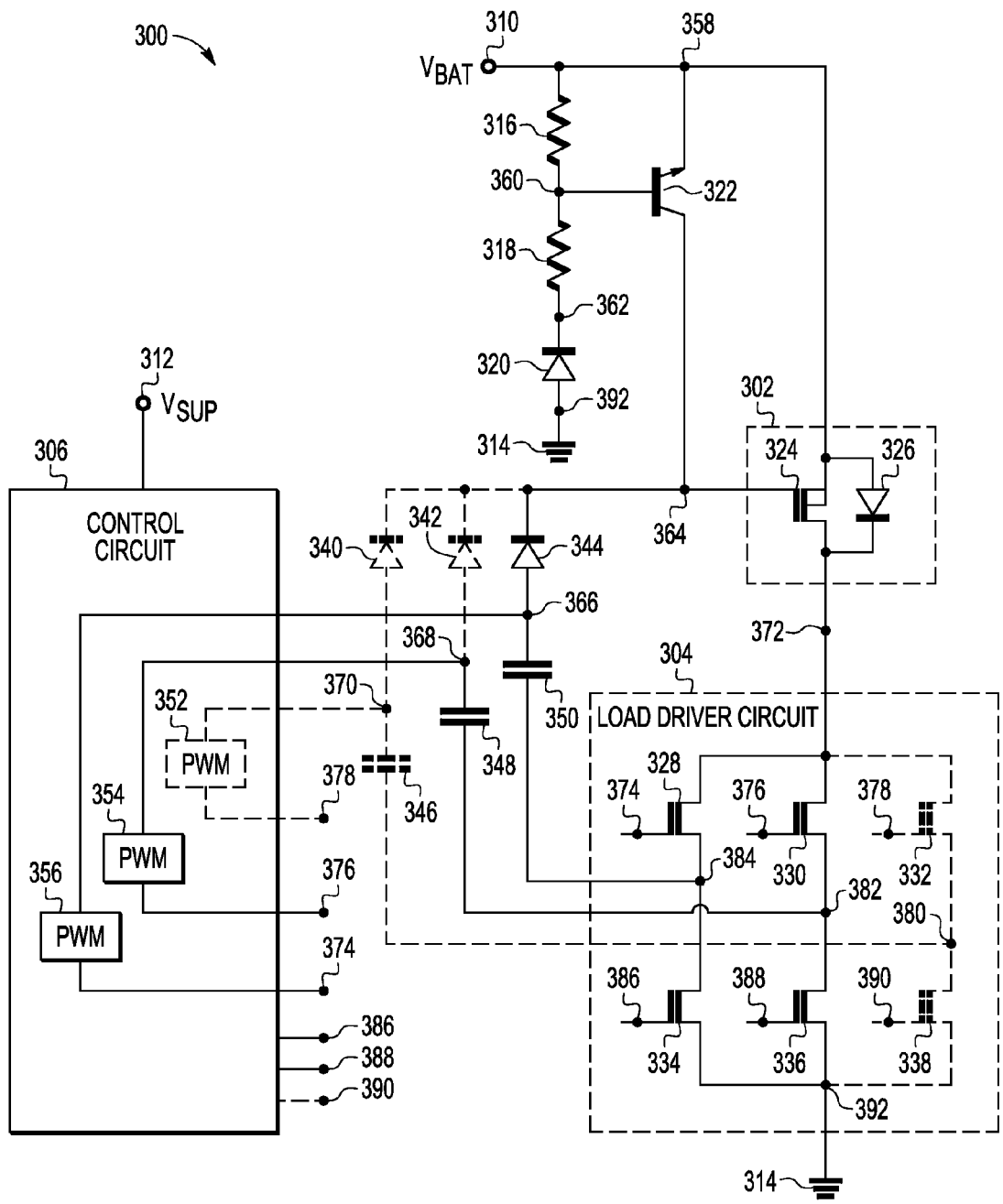
FIG. 3 is a more detailed circuit diagram illustrating a circuit configured for providing reverse battery protection, in accordance with an embodiment.

Turning now to FIG. 2, wherein is depicted a flow diagram illustrating a method 200 performed by a circuit configured for providing reverse battery protection in accordance with the present teachings. In one example scenario, the circuit 100 of FIG. 1 is configured to perform the method 200. Accordingly, one or more components within the circuit 100 is configured to perform one or more functions, for instance as described below, to implement the method 200. In another example scenario, a circuit 300 depicted in FIG. 3 is configured to perform the method 200.

First described is the operation of the circuit 100 of FIG. 1 in accordance with the method 200. At a first point in time, for instance upon circuit start-up, a forward or normal battery condition is generated 202 across the battery supply node 120 and the voltage common node 126. Under these conditions, the control circuit 114 causes a first voltage level to be generated at the second terminal of the bootstrap capacitor 112. For example, the control circuit 114 turns off the topside transistor 106 and turns on the bottomside transistor 108. This pulls the midpoint node 124, and hence the first terminal of the bootstrap capacitor 112, to ground. Circuitry in the control circuit 114 charges the capacitor 112 to a level such that a first voltage this is or is derived from $V_{SUP}$, for instance about 11 V, is generated 204 at the second terminal of the bootstrap capacitor 112 at the node 130.

The control circuit 114 then turns off the bottomside transistor 108 and turns on the topside transistor 106, which pulls the voltage at node 124 to substantially the voltage at the node 122. This further charges the bootstrap capacitor 112, such that the voltage at the first terminal for the bootstrap capacitor 112 is substantially $V_{BAT}$, and the voltage at the second terminal of the bootstrap capacitor 112 is level shifted to 11 V+$V_{BAT}$. More specifically, at start-up during the first point in time, the voltage at the node 122 is $V_{BAT}$ minus a body diode drop of the reverse battery protection transistor 102. However, once the bottomside transistor 108 is turned off and the topside transistor 106 is turned on, the transistor 102 becomes fully enhanced which puts node 122 at $V_{BAT}$ minus a small IR drop across the reverse battery protection transistor 102. Additionally, the topside transistor 106 has a low $R_{DS(on)}$ and, thereby, essentially provides a short between the midpoint node 124 and the node 122. Accordingly, the voltage supply pin 136 is used to generate 204 the first voltage level, e.g., 11 V, at the second terminal of the bootstrap capacitor 112, which is boosted 206 by about $V_{BAT}$ to a second and higher voltage level, namely, 11 V+$V_{BAT}$, when the topside transistor 106 is turned on and the bottomside transistor 108 is turned off.

The second boosted voltage level, also referred to herein as a transistor enhancement voltage level, is used for two purposes during continued operation of the circuit 100. The transistor enhancement voltage level is provided 208, through the diode 110 to the control terminal of the reverse battery protection transistor 102 in order to maintain this transistor in enhancement mode when the battery is correctly applied across the nodes 120 and 126. For example, where the reverse battery protection transistor 102 is an N-channel MOSFET with its source connected to the node 120 and its drain connected to the node 122, the transistor enhancement voltage level or second voltage level, e.g., $V_{BAT}$+11 V, provided to the gate of the transistor 102 pulls the gate well above the source of the transistor 102. This places the reverse battery protection transistor 102 in a low ohmic state so as not to draw power during normal operation of the circuit 100. In other words, the second voltage level maintains the reverse battery protection transistor 102 in enhancement mode during a forward battery condition across the battery supply node 120 and the voltage common node 126.

The control circuit 114 also provides 210 the second voltage level at the node 130, e.g., $V_{BAT}$+11 V, to the control terminal of the topside transistor 106 of the load driver circuit 104, for instance using a switching transistor, to cause the topside transistor 106 to operate in an enhancement mode and a low ohmic state during the forward voltage condition. Accordingly, where the load driver circuit 104 provides a PWM signal to the load circuit 140, the topside transistor 106 is switched on and off using the boosted second voltage level at the second terminal of the capacitor 112 to the provide the PWM signal. Moreover, the bottomside transistor 108 is alternately, to the topside transistor 106, switched on and off to allow the control circuit 114 to replenish any voltage lost at the node 130. At 212, where a reverse battery condition has not been applied, the method 200 continues wherein the forward battery condition is applied 202 across the battery supply node 120 and the voltage common node 126, and the circuit 100 continues normal operation.

Conversely, where, at 212, a reverse battery condition is applied across the battery supply node 120 and the voltage common node 126, the reverse battery protection transistor 102 blocks 214 current through the load driver circuit 104. In an embodiment, circuit 100 includes a turn-off circuit that is connected to the control terminal of the reverse battery protection transistor 102 to facilitate the turn off of that transistor at the start of the reverse battery condition. For example, the circuit includes a turn-off transistor, which is described in more detail below with respect to FIG. 3. Using a turn-off circuit decreases and may eliminate the possibility of a current flowing through the body diodes of the transistors 106 and 108 of the load driver circuit 104 before the reverse battery protection transistor 102 is completely turned off. Alternatively, in the absence of the turn-off circuit, the reverse battery protection transistor 102 will turn off when its gate-to-source voltage falls below its threshold voltage.

Turning now to FIG. 3, which is a more detailed circuit diagram illustrating a circuit 300 configured for providing reverse battery protection, in accordance with the present teachings. Circuit 300 includes similar elements as circuit 100 of FIG. 1. Namely, circuit 300 includes a load driver circuit 304 that is connected to and provides signals to operate a load circuit (not shown). In an embodiment, the load circuit is one that requires a PWM signal for proper operation. The load driver circuit 304 is connected to and receives control signals from a control circuit 306. Circuit 300 also includes a reverse battery protection transistor 302 that is coupled to the load driver circuit 304 by a first bootstrap capacitor 350 and an enhancing diode 344. In an embodiment, the reverse battery protection transistor 302 is an N-Channel MOSFET 324.

More particularly, regarding the connectivity of the above-mentioned components 302, 304, 306, 344, and 350 of circuit 300, the load driver circuit 304 includes at least a first half-bridge circuit having a first topside transistor 328 connected to a first bottomside transistor 334 at a first midpoint node 384. In an embodiment, the transistors in the load driver circuit 304 are any suitable transistors that can be operated as switches and, thereby, switched on an off by the control circuit 306 to provide a PWM signal to operate the load circuit. In one particular embodiment, the topside and bottomside transistors of each half-bridge circuit within the load driver circuit 304 are also N-channel MOSFETs. In another embodiment, one or all of the transistors within the load driver circuit 304 are N type IGBT transistors.

The transistors 328 and 334 are connected at the midpoint node 384 by respective first current terminals of these transistors, which for the transistor 328 is its source and for the transistor 334 is its drain. A control terminal, in this case the gate, for the first topside transistor 328 is connected to the control circuit 306 at a node 374, and the gate for the first bottomside transistor 334 is connected to the control circuit 306 at a node 386. The control circuit 306 provides a control signal to the gates of the transistors in the load driver circuit 304 to switch these transistors on and off at different times to provide the PWM signal to the load circuit, which is connected to all of the midpoint nodes of the load driver circuit 304.

The reverse battery protection transistor 302 is connected in series with the load driver circuit 304 between a battery supply node 358 and a voltage common node 392. More particularly, the source of the N-channel MOSFET 324 is connected to the battery supply node 358, and the drain of the transistor 324 is connected to the drain of the first topside transistor 328 at a node 372. The source the first bottomside transistor 334 is connected to the voltage common node 392. Also shown is the body terminal, i.e., a fourth terminal, of the reverse battery protection transistor 324 connected to its source and an intrinsic body diode 326 of the transistor 324. The diode 326 has its anode at the source of the transistor 324 and its cathode at the drain of the transistor 324. Although not shown, the N-channel MOSFETS within the load driver circuit 304 have a similarly connected body terminal to the source, and intrinsic body diode, e.g., anode to ground 314 and cathode to the respective midpoint node.

During a forward bias condition 202, a battery is connected across the reverse voltage protection transistor 324 and the load driver circuit 304, such that a positive voltage $V_{BAT}$ 310 is connected to the voltage supply node 358, and the voltage common node 392 is connected to a voltage common or electrical ground 314. During the forward bias condition, when turned on, the reverse battery protection transistor 324 allows current flow but blocks current flow through its intrinsic diode when the polarities of the battery are switched during a reverse battery condition across the nodes 358 and 392.

Additionally, a first terminal of the first bootstrap capacitor 350 is connected to the first midpoint node 384, and a second terminal of the first bootstrap capacitor 350 is connected to the control circuit 306 and to an anode of the diode 344 at a node 366. A cathode of the diode 344 is connected to the gate of the reverse battery protection transistor 324 at a node 364. A voltage supply terminal 312 connected to the control circuit 306 is used to provide a supply voltage $V_{SUP}$ to the control circuit 306, which is used to initially charge the first capacitor 350, and any other bootstrap capacitor within the circuit 300, to generate 204 a first voltage level, e.g., 11V, at the second terminal of the bootstrap capacitor(s). The first voltage level is then level shifted 206 to the transistor enhancement voltage level, also referred to herein as the second voltage level, e.g., 11V+$V_{BAT}$. The transistor enhancement voltage level is used to maintain 208 the reverse battery protection transistor 324 in enhancement mode and to periodically operate 210 the topside transistors of the load driver circuit 304 in enhancement mode during a forward bias condition across the nodes 358 and 392.

In addition to the above-described components, the load driver circuit 304 of the circuit 300 also includes at least one other half-bridge circuit. In one particular embodiment, the load driver circuit 304 is an H-bridge circuit that includes the first half-bridge circuit, with transistors 328 and 334, and a second half-bridge circuit having second topside 330 and bottomside 336 transistors coupled at a second midpoint node 382. Circuit 300 further includes a second bootstrap capacitor 348 having first and second terminals. More particularly, the drain of the second topside transistor 330 is connected to the drain of the reverse battery protection transistor 324 at the node 372. The source of the second topside transistor 330 is connected to the drain of the second bottomside transistor 336 at the midpoint node 382. The source of the second bottomside transistor 336 is connected to the voltage common node 392. The gate of the second topside transistor 330 is connected to the control circuit 306 at a node 376, and the gate for the second bottomside transistor 336 is connected to the control circuit 306 at a node 388. Additionally, the first terminal of the second bootstrap capacitor 348 is connected to the second midpoint node 382, and the second terminal of the second bootstrap capacitor 348 is connected to the control circuit 306 at a node 368.

In accordance with the circuit 300 topology thus described, the first capacitor 350 is configured to provide 206 the transistor enhancement voltage level, e.g., $V_{BAT}$+11 V, through the first diode 344 to the control terminal of the reverse battery protection transistor 334 during a forward battery condition across the battery supply node 358 and the voltage common node 392. Additionally, the control circuit 306 is configured to route 210 the transistor enhancement voltage level to the control terminal of the topside transistors during the forward battery condition. The transistor enhancement voltage level is configured to be at a level or magnitude to cause the reverse battery protection transistor 324 and the topside transistors to operate in enhancement mode during the forward battery condition.

Particularly, the second terminal of the capacitor 350 is coupled to the gate of the topside transistor 328 through a PWM circuit 356, and the second terminal of the capacitor 348 is coupled to the gate of the topside transistor 330 through a PWM circuit 354. In an embodiment, the PWM circuits 354 and 356 each includes a switch, such as a switching transistor, which is used to PWM the topside transistor connected to the PWM circuit on and off, using the transistor enhancement voltage level, to control the load driver circuit 304 to provide a PWM current signal to the load circuit. In one particular embodiment where the load driver circuit 304 is configured as an H-bridge circuit, a single diode, e.g., the diode 344, can be used to maintain the reverse battery protection transistor 324 in the enhancement mode. Namely, transistor 324 remains in enhancement mode where the control circuit 306 pulse width modulates the topside transistors at a frequency or rate such that the gate of the transistor 324 is not allowed to discharge to a level that removes the transistor 324 from enhancement mode.

In operation, the PWM circuits 354 and 356 provide to the load driver circuit 304 a pulse width modulation control signal to switch the topside transistors 328 and 330 on and off at different times. Additional PWM circuits (not shown) in the control circuit 306 similarly switch the bottomside transistors 334 and 336 on and off at different times. Particularly, during a first pulse width modulation cycle at a first time when the first topside transistor 328 is switched on, the first bottomside transistor 334 is switched off, and the second topside transistor 330 is switched off, the transistor enhancement voltage level is provided to the control terminal of the reverse battery protection transistor 324 through the first diode 344 coupled in series with the first capacitor 350. During a second pulse width modulation cycle at a second time when the first topside transistor 328 is switched off, the first bottomside transistor 334 is switched on, and the second topside transistor 330 is switched on, the first diode 344 delays decay of the voltage level at the control terminal of the reverse battery protection transistor 324 such that the reverse battery protection transistor 324 remains in enhancement mode. Moreover, the voltage level at the second terminal of the first capacitor 350 is replenished back up to the transistor enhancement voltage level for providing to the control terminal of the reverse battery protection transistor 324 through the first diode 344 during a subsequent pulse width modulation cycle when the first topside transistor 328 is switched back on.

In a further embodiment, the circuit 300 includes multiple diodes used to maintain the reverse battery protection transistor 324 in enhancement mode during the forward bias condition. For example, where the load driver circuit 304 is configured into an H-bridge configuration, the circuit 300 further includes a second diode 342 having an anode connected to the second terminal of the second capacitor 348 at the node 368 and a cathode connected to the control terminal of the reverse battery protection transistor 324 at the node 364. In accordance with this embodiment, the second diode 342 is configured, during a second pulse width modulation cycle at a second time, to route and provide the transistor enhancement voltage level at the second terminal of the second capacitor 348 to the control terminal of the reverse battery protection transistor 324. Moreover, when the topside transistor 328 is switched on, the second topside transistor is switched off and the second bottomside transistor 336 is switched on, the voltage level at the second terminal of the second capacitor 348 is replenished to the transistor enhancement voltage level.

In yet another embodiment, the load driver circuit 304 includes additional half-bridge circuits, the number of which may be limited at least in part by design considerations for powering the attached load circuit. In one example implementation, the load driver circuit 304 is a three phase inverter circuit having the first half-bridge circuit with transistors 328 and 334, the second half-bridge circuit with transistors 330 and 336, and a third half-bridge circuit having third topside 332 and bottomside 338 transistors coupled at a third midpoint node 380. This embodiment of the circuit 300 also includes a third bootstrap capacitor 346 coupled between the third midpoint node 380 and the control circuit 306.

More particularly, the drain of the third topside transistor 332 is connected to the drain of the reverse battery protection transistor 324 at the node 372. The source of the third topside transistor 332 is connected to the drain of the third bottomside transistor 338 at the midpoint node 380. The source of the third bottomside transistor 338 is connected to the voltage common node 392. The gate of the third topside transistor 332 is connected to the control circuit 306 at a node 378, and the gate for the third bottomside transistor 338 is connected to the control circuit 306 at a node 390. Additionally, the first terminal of the third bootstrap capacitor 346 is connected to the third midpoint node 380, and the second terminal of the third bootstrap capacitor 346 is connected to the control circuit 306 at a node 370. Also, the second terminal of the capacitor 346 is coupled to the gate of the third topside transistor 332 through a PWM circuit 352, which is used to PWM the transistor 332 using the transistor enhancement voltage level.

In one particular embodiment, where the load driver circuit 304 is configured as a three phase inverter circuit, a single diode, e.g., the diode 344, can be used to maintain the reverse battery protection transistor 324 in the enhancement mode. Namely, transistor 324 remains in enhancement mode where the control circuit 306 pulse width modulates the topside transistors at a frequency or rate such that the gate of the transistor 324 is not allowed to discharge to a level that the transistor 324 comes out of enhancement mode. In a further embodiment, the circuit 300 includes multiple diodes to maintain the reverse battery protection transistor 324 in the enhancement mode.

For instance, the circuit 300 includes one or both of the diodes 342 or a third diode 340 having an anode connected to the second terminal of the third capacitor 346 at the node 370 and a cathode connected to the control terminal of the reverse battery protection transistor 324 at the node 364. During normal operation and in accordance with this embodiment, the third diode 340 is configured, during a third pulse width modulation cycle at a third time when the topside transistor 332 is switched on and the bottomside transistor 338 is switched off, to route and provide the transistor enhancement voltage level at the second terminal of the third capacitor 346 to the control terminal of the reverse battery protection transistor 324. Moreover, when the topside transistor 332 is switched off, and the bottomside transistor 338 is switched on, the voltage level at the second terminal of the third capacitor 346 is replenished to the transistor enhancement voltage level. The first PWM cycle when the diode 344 provides the transistor enhancement voltage level to the gate of the transistor 324; the second PWM cycle when the diode 342 provides the transistor enhancement voltage level to the gate of the transistor 324; and the third PWM cycle when the diode 340 provides the transistor enhancement voltage level to the gate of the transistor 324 need not occur consecutively.

As mentioned above the circuit can also include a turn-off circuit coupled to the gate of the reverse battery protection transistor 324. In an embodiment, the turn-off circuit includes a turn-off transistor. In this particular embodiment, the turn-off transistor is an NPN bipolar junction transistor 322 having a first current terminal connected to the battery supply node 358, a second current terminal connected to the control terminal of the reverse battery protection transistor 324 at the node 364, and a control terminal coupled between the battery supply node 358 and the voltage common node 392. More specifically, the turn-off circuit also includes resistors 316 and 318 and a diode 320. A first terminal of the resistor 316 is connected to the battery supply node 358. A second terminal of the resistor 316 is connected to a first terminal of the resistor 318 and to the control terminal of the turn-off transistor 322 at a node 360. A second terminal of the resistor 318 is connected to a cathode of the diode 320 at a node 362, and an anode of the diode 320 is connected to the voltage common node 392. Accordingly, when a reverse bias is inadvertently applied to the battery supply node 358 and the voltage common node 392, the transistor 322 pulls the gate of the reverse battery protection transistor 324 low much faster than would occur without the presence of the turn-off circuit.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

For the sake of brevity, conventional techniques related to semiconductor fabrication including those using conventional CMOS technology, CMOS devices, MOSFETs, bipolar junction transistors, half-bridge circuits, H-bridge circuits, three phase inverters, various types of load circuits, and other functional aspects of a system or IC, and the individual system or IC operating components, may not be described in detail. Furthermore, the connecting lines shown in the various figures contained herein are intended to represent example functional relationships and/or physical couplings between the various elements. It should be noted that many alternative or additional functional relationships or physical connections may be present in a practical embodiment. Moreover, the various IC embodiments described above may be produced or fabricated using conventional semiconductor processing techniques, e.g., well known CMOS techniques.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the term "configured to", "configured with", "arranged to", "arranged with", "capable of" and any like or similar terms means that referenced circuit elements have an internal physical arrangement such as by virtue of a particular transistor technology used and/or physical coupling and/or connectivity with other circuit elements in an inactive state. This physical arrangement and/or physical coupling and/or connectivity while in the inactive state enables the circuit elements to perform stated functionality while in the active state of receiving and processing various signals at inputs of the circuit elements to generate signals at the output of the circuit elements. A device or structure that is "configured" in a certain way is configured in at least that way, but may also be configured in ways that are not described.

As further used herein, a "node" means any internal or external reference point, connection point, junction, signal line, conductive element, or the like, at which a given signal, logic level, voltage, data pattern, current, or quantity is present. Furthermore, two or more nodes may be realized by one physical element, and two or more signals can be multiplexed, modulated, or otherwise distinguished even though received or output at a common node.

The above description refers to nodes or features being "connected" or "coupled" together. As used here and, unless expressly stated otherwise, "coupled" means that one node or feature is directly or indirectly joined to or is in direct or indirect communication with another node or feature, and not necessarily physically. As used herein, unless expressly stated otherwise, "connected" means that one node or feature is directly joined to or is in direct communication with another node or feature. For example, a switch may be "coupled" to a plurality of nodes, but all of those nodes need not always be "connected" to each other; moreover, the switch may connect different nodes to each other depending on the state of the switch. Furthermore, although the various circuit schematics shown herein depict certain example arrangement of elements, additional intervening elements, devices, features, or components may be present in an actual embodiment, assuming that the functionality of the given circuit is not adversely affected.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A circuit configured for providing reverse battery protection, the circuit comprising:
   a load driver circuit comprising at least a first half-bridge circuit, with each half-bridge circuit having a topside transistor and a bottomside transistor coupled at a corresponding midpoint node by a first current terminal of both the topside and bottomside transistors, wherein a second current terminal of each bottomside transistor is coupled to a voltage common node;
   a reverse battery protection transistor having a first current terminal coupled to a battery supply node and a second current terminal coupled to a second current terminal of each topside transistor;
   a first capacitor having a first terminal coupled to a first midpoint node between first topside and bottomside transistors of the first half-bridge circuit;
   a first diode having an anode coupled to a second terminal of the first capacitor and a cathode coupled to a control terminal of the reverse battery protection transistor.

2. The circuit of claim 1, wherein the reverse battery protection transistor is an N-channel metal-oxide semiconductor field-effect transistor.

3. The circuit of claim 2 further comprising a turn-off circuit that includes a turn-off transistor having a first current terminal coupled to the battery supply node, a second current terminal coupled to the control terminal of the reverse battery protection transistor, and a control terminal coupled between the battery supply node and the voltage common node.

4. The circuit of claim 3, wherein the turn-off transistor is an NPN bipolar junction transistor.

5. The circuit of claim 2, wherein the topside and bottomside transistors of each half-bridge circuit are N-channel metal-oxide semiconductor field-effect transistors.

6. The circuit of claim 1, wherein the load driver circuit is an H-bridge circuit comprising the first half-bridge circuit and a second half-bridge circuit having second topside and bottomside transistors coupled at a second midpoint node, wherein the circuit further comprises a second capacitor having first and second terminals, wherein the first terminal is coupled to the second midpoint node.

7. The circuit of claim 6 further comprising:
   a second diode having an anode coupled to the second terminal of the second capacitor and a cathode coupled to the control terminal of the reverse battery protection transistor.

8. The circuit of claim 1, wherein the load driver circuit is a three phase inverter circuit comprising the first half-bridge circuit, a second half-bridge circuit having second topside and bottomside transistors coupled at a second midpoint node, and a third half-bridge circuit having third topside and bottomside transistors coupled at a third midpoint node, wherein the circuit further comprises:
   a second capacitor having first and second terminals, wherein the first terminal of the second capacitor is coupled to the second midpoint node;
   a third capacitor having first and second terminals, wherein the first terminal of the third capacitor is coupled to the third midpoint node.

9. The circuit of claim 8 further comprising at least one of:
a second diode having an anode coupled to the second terminal of the second capacitor and a cathode coupled to the control terminal of the reverse battery protection transistor; or
a third diode having an anode coupled to the second terminal of the third capacitor and a cathode coupled to the control terminal of the reverse battery protection transistor.

10. The circuit of claim 1 further comprising a control circuit coupled between the first capacitor and a control terminal of each topside transistor of the load driver circuit, wherein:
the first capacitor is configured to provide a transistor enhancement voltage level through the first diode to the control terminal of the reverse battery protection transistor during a forward battery condition across the battery supply node and the voltage common node; and
the control circuit is configured to route the transistor enhancement voltage level to a control terminal of at least one of the topside transistors during the forward battery condition, wherein the transistor enhancement voltage level is configured to cause the reverse battery protection transistor and the at least one topside transistor to operate in enhancement mode during the forward battery condition.

11. A method performed in a circuit configured for providing reverse battery protection, the method comprising:
generating a first voltage level at a second terminal of a first capacitor, wherein a first terminal of the first capacitor is coupled to a load driver circuit at a first midpoint node between first topside and bottomside transistors of the load driver circuit, wherein the first voltage level is generated while the first bottomside transistor is on and the first topside transistor is off;
boosting the voltage level at the second terminal of the first capacitor to a second voltage level that is higher than the first voltage level while the first bottomside transistor is off and the first topside transistor is on;
providing the second voltage level to a control terminal of a reverse battery protection transistor that is coupled in series with the load driver circuit between a battery supply node and a voltage common node, wherein the second voltage level is provided through a first diode coupled in series with the first capacitor between the first midpoint node and the control terminal of the reverse battery protection transistor.

12. The method of claim 11, wherein the second voltage level maintains the reverse battery protection transistor in enhancement mode during a forward battery condition across the battery supply node and the voltage common node.

13. The method of claim 12, wherein the reverse battery protection transistor blocks current through the load driver circuit during a reverse battery condition across the battery supply node and the voltage common node.

14. The method of claim 12 further comprising, at a start of the reverse battery condition, turning off the reverse battery protection transistor using a turn off transistor coupled to the control terminal of the reverse battery protection transistor.

15. The method of claim 12 further comprising routing the second voltage level to a control terminal of the first topside transistor to cause the first topside transistor to operate in an enhancement mode during the forward battery condition.

16. The method of claim 11, wherein the load driver circuit comprises at least one other topside and bottomside transistor coupled to at least one other midpoint node, the method further comprising providing to the load driver circuit a pulse width modulation control signal to switch the topside transistors on and off at different times, wherein during a first pulse width modulation cycle when the first topside transistor is on, the first bottomside transistor is off and at least one other topside transistor is off, the second voltage level is provided to the control terminal of the reverse battery protection transistor through the first diode coupled in series with the first capacitor.

17. The method of claim 16, wherein during a second pulse width modulation cycle when the first topside transistor is off, the first bottomside transistor is on, and at least one other topside transistor is on;
the first diode delays decay of the second voltage level at the control terminal of the reverse battery protection transistor such that the reverse battery protection transistor remains in an enhancement mode; and
the voltage level at the second terminal of the first capacitor is replenished to the second voltage level for providing to the control terminal of the reverse battery protection transistor through the first diode during a subsequent pulse width modulation cycle when the first topside transistor is on.

18. The method of claim 11, wherein the load driver circuit comprises at least two sets of topside and bottomside transistors coupled at respective midpoint nodes, the method further comprising:
generating the second voltage level at a second terminal of a second capacitor, wherein a first terminal of the second capacitor is coupled to the load driver circuit at a second midpoint node between second topside and bottomside transistors of the load driver circuit;
providing, to the topside transistors, a pulse width modulation control signal to switch the topside transistors on and off at different times, wherein the control signal is generated from the second voltage level, wherein:
during a first pulse width modulation cycle, the second voltage level is provided to the control terminal of the reverse battery protection transistor through the first diode coupled in series with the first capacitor; and
during a second pulse width modulation cycle, the second voltage level is provided to the control terminal of the reverse battery protection transistor through a second diode coupled between the control terminal of the reverse battery protection transistor and the second terminal of the second capacitor.

19. A circuit configured for providing reverse battery protection, the circuit comprising:
a load driver circuit having at least a first half-bridge circuit, with each half-bridge circuit having a topside transistor and a bottomside transistor coupled at a corresponding midpoint node by a first current terminal of both the topside and bottomside transistors, wherein a second current terminal of each bottomside transistor is coupled to a voltage common node:
a reverse battery protection transistor coupled in series with the load driver circuit between a battery supply node and the voltage common node;
a set of capacitors having at least a first capacitor, wherein each capacitor has a first terminal coupled to a midpoint node of a different half-bridge circuit, wherein each capacitor is configured to generate a transistor enhancement voltage level at a second terminal of the capacitor, wherein the first terminal of the first capacitor is coupled to a first midpoint node between first topside and bottomside transistors of the first half-bridge circuit;
a control circuit coupled to the second terminal of each capacitor, wherein the control circuit is configured, during a forward battery condition between the battery supply node and the voltage common node, to route the transistor enhancement voltage level, at different times, to a control terminal of each topside transistor;

a first diode having an anode coupled to the second terminal of the first capacitor and a cathode coupled to a control terminal of the reverse battery protection transistor, wherein the first diode is configured, at a first time during the forward battery condition, to route the transistor enhancement voltage level from the second terminal of the first capacitor to the control terminal of the reverse battery protection transistor.

20. The circuit of claim 19 further comprising at least a second diode having an anode coupled to the second terminal of a second capacitor of the second set of capacitors and a cathode coupled to the control terminal of the reverse battery protection transistor, wherein the second diode is configured, at a second time during the forward battery condition, to route the transistor enhancement voltage level from the second terminal of the second capacitor to the control terminal of the reverse battery protection transistor.

* * * * *